United States Patent Office 3,388,080
Patented June 11, 1968

3,388,080
PROCESS FOR THE PRODUCTION OF
PERMSELECTIVE MEMBRANES
Francis de Körosy, 8 Sokolov, and Jacob Shorr, 9 Bialik, both of Beersheba, Israel
No Drawing. Continuation-in-part of application Ser. No. 154,065, Nov. 21, 1961. This application Mar. 11, 1966, Ser. No. 533,429
Claims priority, application Israel, Dec. 1, 1960, 14,720
9 Claims. (Cl. 260—2.2)

This application is a continuation-in-part of our copending application Ser. No. 154,065, filed Nov. 21, 1961, now abandoned.

The present invention relates to a process for the production of permselective membranes for use in electrodialysis.

Hydrophilic organic membranes made from hydrophobic films by introducing anionic or cationic substituents into them, are known. Substituted chlorinated rubber and vinylic compounds in membrane form, and the preparation of same, are also known. An improvement of this relating to the preparation of membranes prepared from polyalkylenic base material, subjected to swelling in a monomeric aromatic vinylic compound into which membranes ionic groups are later introduced, is also known.

According to the present invention, there is provided a process for the production of permselective membranes for use in electrodialysis which comprises sulfochlorinating a polyolefine sheet in heterogenous reaction so as to result in a substantially water-insoluble product, and then introducing, in place of the chlorine atoms of the resulting product, groups selected from hydroxyl and basic groups, to produce thereby a cation-exchange or an anion-exchange membrane, respectively.

Thus, sulfochlorinated polyolefine membranes are obtained as an intermediate product. This intermediate product may then be converted to: (1) cation-exchange membranes, by introducing hydroxyl groups in place of the chlorine atoms; (2) anion exchange membranes, by introducing basic groups in place of the chlorine atoms; or (3) membranes having both cation-exchange and anion-exchange portions, as will be described more fully below.

The polyolefines used are either polyethylene or polypropylene having molecular weights above 5000.

The sulfochlorination may be effected by reacting the sheet with sulfuryl chloride, in the liquid or vapor state, while irradiated with actinic light. Alternatively, the sulforchlorination may be effected by reacting the sheet with sulfur dioxide and chlorine while irradiated with actinic light.

After the appropriate period of reaction, the sulfochlorinated material is removed, for example, from the reaction mixture, washed if necessary, and subsequently converted either into anion-active or cation-active form by introduction of said appropriate substituents.

If, for example, the sulfochlorinated polyefine membrane is hydrolyzed in alkaline solution, a water insoluble film membrane is obtained which exhibits cation-exchange properties. Such material has a capacity of about 1–2 meq./g., a low electrical resistance (about 1 ohm per cm.$^2$ or less for films of about 20 microns) and a high degree of permselectivity (e.g. above 90% for K$^+$ in N/10; N/20 KCl).

If an anion-exchange membrane is to be produced, the hydrolysis stage is replaced by one or more steps which introduce free basic functions in place of the chlorine atoms.

Preferably, the free basic pendant functions are those having a basic dissociation constant of not less than $5 \times 10^{-4}$. The introduction of the free basic functions may be accomplished by esterification or by aminolysis of the sulfuryl chloride with polyvalent amines, such as tetraethylenepentamine, N,N - dimethylaminoethylendiamine, 1,3-diaminopropane, or bis (aminopropyl)-piperazine. The product may be made more strongly basic by alkylating and quaternizing a non-quaternary amine derivative, for example, with dibromoethylene, methyl bromide or dimethylsulfate.

The thus prepared membranes exhibit good permselective properties (about 90% towards Cl in N/10: N/20 KCl), a capacity of about 0.8–2 meq./g., and a low electrical resistance (about 2–5 ohms per cm.$^2$).

The original properties of the polyolefines are substantially modified by the sulfochlorination and by the subsequent treatment. The plasticity is considerably decreased by the sulfochlorination and it is further decreased if subjected to heat treatment. Cross-linking is enhanced by using polyvalent amines for aminolysis and halo-alkyl compounds containing more than one reactive halogen for alkylation and thereby quaternization.

The sulfochlorination reaction may be controlled by varying the reaction conditions. The velocity of reaction may be increased by using suitable catalysts and by irradiation with visible or ultraviolet light, i.e. actinic light. An increased velocity of reaction can also be obtained by adding a suitable polyolefin swelling agent, such as carbon tetrachloride or decaline, to the reaction mixture.

The sulfochlorination can also be carried out by means of sulfur dioxide and chlorine preferably under irradiation with visible or ultraviolet light. This reaction may be effected on the starting material as such (which may also be swollen with suitable solvents) or containing appropriate catalysts.

It is also possible to make use of the intermediate product obtained by sulfochlorination in order to produce membranes having both anion and cation activity in different parts of the same sheet. To achieve this end, the sulfochloride intermediate membrane is partially immersed in an aminolytic solution of low vapour pressure, say a polyethylenepolyamine (e.g. as in Example 5 below), whereby the immersed part is converted into an anion active membrane. The remaining unreacted part of the sulfochlorinated film is hydrolyzed in an alkaline solution of say NaOH in aqueous dioxane (e.g. as in Example 2 below). In this way it becomes possible to obtain integral sheets comprising anion and cation selective portions which can otherwise be obtained only with great difficulty by cementing together individual anion-selective and cation-selective membranes.

Membranes obtained by the aforementioned processes have been used in an electrodialytic water desalination apparatus of 10×20 cm. membrane surface and operated under a current density of 15 ma./cm.$^2$. The Coulomb efficiency of desalination was about 90%.

In the following the invention will be exemplified without being restricted to the examples given:

Example 1

A polyethylene film of 0.003 cm. thickness was immersed in a mixture of sulfuryl chloride and carbon tetrachloride (3:1 by volume) in the presence of 0.25% (w./v.) of anhydrous AlCl$_3$ and kept about 35° C. for 8 hours in daylight. After washing in carbon tetrachloride the film was hydrolyzed during 1 hour in 5% (weight/volume) solution of sodium hydroxide in a water bath. The resultant film had an electrical resistance of 1 ohm/cm.$^2$ and permselectivity of 92% for K$^+$ ions in a N/10 KCl solution.

Example 2

A polyethylene film of 0.009 cm. thickness was introduced into a mixture of sulfurylchloride and carbon tetrachloride (4:1 by volume) saturated with HCl gas. The reaction was carried out during two hours at a temperature about 35° C. under irradiation with a 75 w. mercury lamp. The film was hydrolyzed for 12 hours in a 5% w./v. solution of NaOH in 1.1 dioxane-water at room temperature. Its resistance was 3 ohms/cm.$^2$ and its capacity similar to that of the film described in the first example.

Example 3

A film of polyethylene of 0.01 cm. thickness was reacted during two hours with a gaseous mixture of sulfur dioxide and chloride, which was passed through carbon tetrachloride. The reaction was carried out under irradiation by direct sunlight for two hours. The thus obtained chlorosulfonated product was subjected to hydrolysis as described in Example I. A film having electric resistance of 5 ohm/cm.$^2$ in N/10 NaCl solution was obtained. The capacity of the material was 0.9 meq./g. The permselectivity of the membrane was 87% towards K$^+$ ions in a N/10 KCl solution.

Example 4

A film of polyethylene of 0.009 cm. thickness was reacted with sulfuryl chloride vapour under irradiation with direct sunlight during two hours. After washing with carbon tetrachloride the film was immersed in a solution of 1 part by volume of ethylenediamine in two volumes of dry dioxane and kept at room temperature for 10 hours. The resulting film was quaternized with 50% (vol.) alcoholic ethylene dibromide. The thus obtained film had an electric resistance of 5 ohms/cm.$^2$. The permselectivity for Cl$^-$ ions in a N/10 KCl solution was about 90%.

Example 5

A film of polyethylene of 0.005 cm. thickness was immersed in a mixture of 1 volume sulfuryl chloride (containing free Cl$_2$) with 1 volume carbon tetrachloride which contained 0.25% AlCl$_3$ and was saturated with HCl gas. It was irradiated with direct sunlight for 1¼ hours, washed in carbon tetrachloride and aminolysed in tetraethylenepentamine at 80° C. for 2 hours. The resulting membrane had 3 ohms/cm.$^2$ resistance and 85% permselectivity for Cl$^-$ ions.

Example 6

A 0.2 mm. thick polypropylene sheet was softened overnight by immersion in decaline. It was then suspended in a glass walled tank and illuminated in a 1:2 mixture of Cl$_2$:SO$_2$ with incandescent lamps for 5 hours. After sulfochlorination one part of it was hydrolyzed in 10% NaOH solution at 60° C. for 4 hours yielding a permselective membrane of 95% permselectivity and 2 ohms per cm.$^2$ resistance in N/10 KCl solution. Another part of the membrane was reacted with N,N-dimethylamino-3-aminopropane at room temperature for two days, alkylated in a 20% solution of methylbromide in alcohol and equilibrated in KCl solution after washing in water. It yielded an anion selective membrane of 93% permselectivity and 4 ohms per cm.$^2$ resistance in N/10 KCl.

We claim:
1. A process for the production of permselective membranes for use in electrodialysis, which comprises sulfochlorinating a polyolefine sheet in heterogenous reaction so as to result in a substantially water-insoluble product, said polyolefine being selected from the group consisting of polyethylene and polypropylene and having a molecular weight above 5000; and introducing, in place of the chlorine atoms of the resulting product, groups selected from hydroxyl and basic groups, to produce thereby a cation-exchange or an anion-exchange membrane, respectively, said basic groups being selected from amines and quaternary ammonium derivatives.
2. A process as defined in claim 1, wherein the sulfochlorination is effected by reacting the sheet with sulfuryl chloride while irradiated with actinic light.
3. A process as defined in claim 1, wherein the sulfochlorination is effected by reacting the sheet with sulfur dioxide and chlorine while irradiated with actinic light.
4. A process as defined in claim 1, wherein hydroxyl groups are introduced in place of the chlorine atoms by hydrolysis in an alkaline solution, resulting in a cation-exchange membrane.
5. A process as defined in claim 1, wherein basic groups are introduced in place of the chlorine atoms by aminolysis with a polyvalent amine, resulting in an anion-exchange membrane.
6. A process as defined in claim 1, wherein polyvalent amine groups are introduced in place of the chlorine atoms and are made more strongly basic by quaternizing said amine groups, resulting in an anion-exchange membrane.
7. A process as defined in claim 1, wherein the process is effected in the presence of a swelling agent for the polyolefine sheet.
8. A process as defined in claim 1, wherein one part of the sheet is made anion selective by introducing in that one part basic groups in place of the chlorine atoms, said basic groups being selected from amines and quaternary ammonium derivatives, and another part of the sheet is made cation selective by introducing in that part hydroxyl groups in place of the chlorine atoms.
9. A process as defined in claim 1, wherein the polyolefine sheet is polyethylene.

References Cited

UNITED STATES PATENTS

| | | | |
|---|---|---|---|
| 2,962,454 | 11/1960 | McRae et al. | 260—2.2 |
| 3,314,925 | 4/1967 | King | 260—79.3 |
| 2,933,460 | 4/1960 | Richter et al. | 260—2.1 |
| 2,212,786 | 8/1940 | McQueen | 260—79.3 |
| 2,891,916 | 6/1959 | Hwa | 260—2.2 |
| 2,906,715 | 9/1959 | Hagge et al. | 260—2.1 |

FOREIGN PATENTS 747,948   4/1956   Great Britain.

OTHER REFERENCES

Fieser and Fieser, Organic Chemistry, Heath & Co., Boston, 1950, pp. 44–45.

Frilette, Journal of Physical Chemistry, vol. 60, 1956, pp. 435–439.

WILLIAM H. SHORT, *Primary Examiner.*

C. A. WENDEL, M. GOLDSTEIN, *Assistant Examiners.*